United States Patent [19]

Colautti

[11] 4,452,545

[45] Jun. 5, 1984

[54] PIVOTAL AND MOVABLE CONNECTION

[75] Inventor: Albert J. Colautti, Windsor, Canada

[73] Assignee: General Motors Corporation, Detroit, Mich.

[21] Appl. No.: 364,483

[22] Filed: Apr. 1, 1982

[51] Int. Cl.[3] .......................................... F16C 17/26

[52] U.S. Cl. .................................... 403/61; 403/85; 403/161; 308/3.6

[58] Field of Search .................. 403/61, 85, 161, 162; 16/273, 275, 289; 308/3.6, 3 R

[56] References Cited

U.S. PATENT DOCUMENTS

| | | | |
|---|---|---|---|
| 2,684,257 | 7/1954 | Roethel | 403/61 |
| 2,772,901 | 12/1956 | Roethel | 403/61 |
| 3,234,584 | 2/1966 | Valade | 16/128.1 |
| 3,351,975 | 11/1967 | Goto | 16/289 X |

*Primary Examiner*—Cornelius J. Husar
*Assistant Examiner*—Joseph A. Fischetti
*Attorney, Agent, or Firm*—Herbert Furman

[57] ABSTRACT

A pivotal and movable connection between a pair of members which includes a slot in an offset portion of one of the members to locate the edge portions of the slot in laterally offset parallel relationship. A shaft on the other member mounts a pair of rollers, each engageable with a respective edge portion of the slot under loading between the members in a direction normal to the slot. The rollers are located by spacers engageable with planar portions of the one member and plastic ribs mounted on the one member.

3 Claims, 3 Drawing Figures

PIVOTAL AND MOVABLE CONNECTION

This invention relates to a pivotal and movable connection between relatively movable parts and more particularly to such a connection for maintaining minimum rolling friction between the parts in the direction of rolling movement under loads applied in a direction normal to the direction of rolling movement.

The connection of this invention is particularly adaptable for use in vehicle body hardware components, such as hood hinges and deck lid hinges, wherein a pair of relatively movable pivoted components are subjected to vertical loads in either direction while moving horizontally with respect to each other.

In the preferred embodiment of the invention, the connection includes an elongated slot provided in an offset portion of one of the members. The offset portion is of generally flattened S-cross-section and the edge portions of the slot are located in the planar portions of the one member to each side of the offset portion so as to be located in laterally spaced generally parallel relationship to each other. The other member mounts a shaft which rotatably supports a pair of independently rotatable rollers, each respective to one edge portion of the slot and located in immediate adjacent relationship with respect thereto. Lateral spacers, such as washers, are mounted on the shaft to each side of the rollers and each such spacer engages one side of one planar portion of the one member adjacent one edge portion of the slot and a plastic spacer rib on the other side of the other planar portion of the one member adjacent the other edge portion of the slot. The engagement of the spacers with the planar portion of the one member and the plastic ribs locates the rollers relative to respective edge portions of the slot. When a load in a direction normal to the slot is imposed on the other member, one of the rollers engages its respective edge portion and rolls therealong as the other roller moves slightly away from its respective edge portion. Likewise when the vertical load is applied in an opposite direction, the one roller moves away from its respective edge portion while the other roller moves into engagement with its respective edge portion. Thus the direction of loading between the members controls which roller engages its respective edge portion while further separating the other roller from its respective edge portion. The connection thus provides for ease of relative rolling movement between the members regardless of loading normal to the direction of movement.

The primary object of this invention is to provide an improved pivotal and movable connection between a pair of members to maintain minimum rolling friction regardless of loading between the members in a direction normal to the direction of movement.

This and other objects of the invention will be readily apparent from the following specification and drawings wherein.

Figure 1:
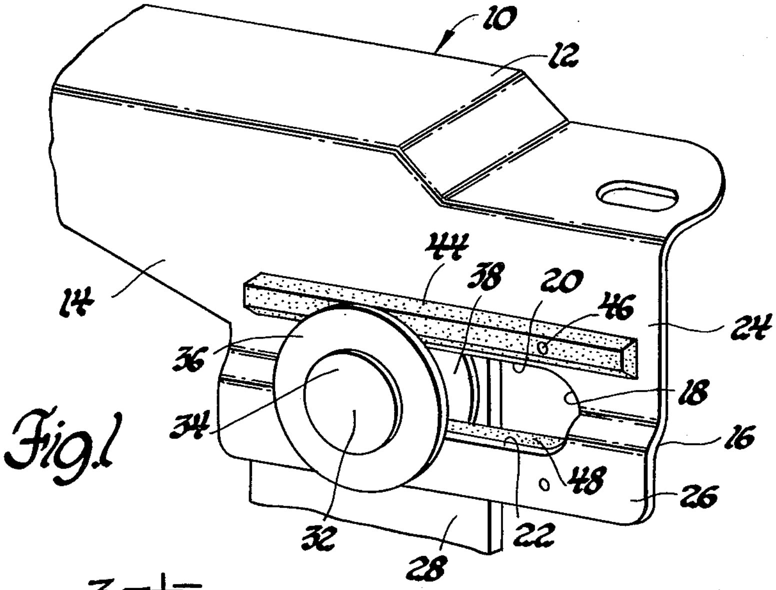
FIG. 1 is a partial perspective view of the rear portion of a vehicle hood hinge member intended to be mounted on a vehicle hood and connected by a link to another vehicle hood hinge member intended to be mounted on the front compartment of the vehicle.
Figure 2:
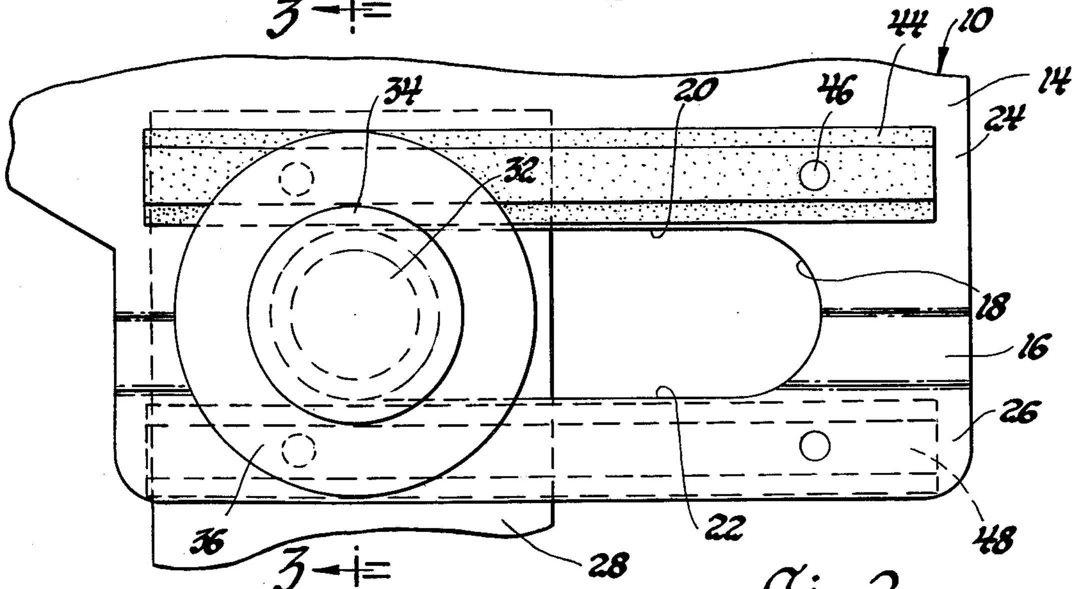
FIG. 2 is an enlarged elevational view of a portion of FIG. 1.
Figure 3:
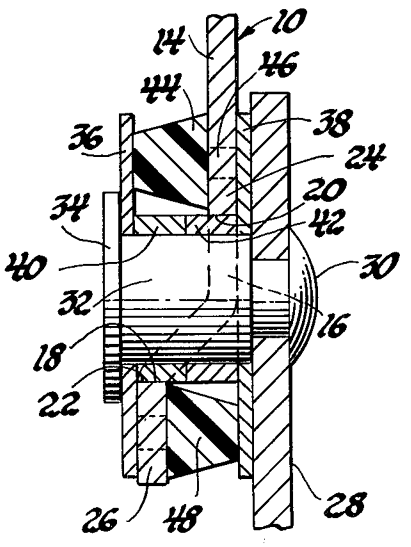
FIG. 3 is a sectional view taken generally along the plane indicated by line 3—3 of FIG. 2.

Referring now particularly to FIG. 1 of the drawings, a vehicle hood hinge includes an upper hinge member designated generally 10 which includes a lateral mounting flange 12 adapted to be secured to the inner panel of the vehicle hood and a vertically depending flange 14 at its rear portion. The flange 14 includes an offset portion 16 of generally flattened S-cross-section which is provided with a closed horizontally elongated slot 18. As shown in FIG. 3, the upper and lower edge portions 20 and 22 of the slot 18 are oriented in respective planar portions 24 and 26 of flange 14. Since the plane of flange portion 24 is offset laterally from the plane of flange protion 26, the upper edge portion 20 in flange portion 24 is likewise offset laterally from the lower edge portion 22 in flange portion 26.

The rear portion of hinge member 10 is connected to a lower hinge member, not shown, by a link or member 28. The upper end of the member 28 is apertured and secured to a headed over shouldered portion 30 of a headed rivet or shaft 32 which extends through the slot 18, with the head 34 of the shaft having an OD greater than the width of the slot. An outboard washer or spacer 36 and an inboard washer or spacer 38 are rotatably mounted on the shaft 32 and respectively bear against the head 34 of the shaft and the outboard side of planar portion 26, member 28 and the inboard side of planar portion 24. Also rotatably mounted on the shaft 32 for rotation independently of each other are a pair of like rollers 40 and 42, the roller 40 being respective to the edge portion 22 of slot 18 and the roller 42 being respective to the edge portion 20 of this same slot. The rollers 40 and 42 are captured between the spacers 36 and 38 but all are freely rotatable about the axis of shaft 32 independently of each other. There is a nominal clearance of from one to two thousandths of an inch between each roller and its respective edge portion.

An elongated frustoconically tapered plastic rib 44 is mounted on the outboard side of planar portion 24 of flange 14 adjacent edge portion 20 in a suitable manner such as by rivets 46. A like rib 48 is mounted in the same manner to the inboard side planar portion 26 adjacent edge portion 22. The spacers 36 and 38 slidably bear against respective ribs 44 and 48 as well as respective planar portions 26 and 24 to position the rollers 40 and 42 with respect to their respective edge portions 22 and 20.

If the members 10 and 28 are subjected to a relative vertical load tending to move the member 28 downwardly relative to the member 10 as the members move horizontally relative to each other, the roller 40 will move slightly downwardly into load carrying engagement with the edge portion 22 of slot 18 and roll rearwardly therealong during horizontal shifting movement of the members, while the roller 42 will move slightly downwardly away from its respective edge portion 20 of the slot. Only roller 40 is in a load-carrying relationship. Since only one roller instead of two engages one edge portion, the rolling friction will be at a minimum. Likewise if a relative vertical load is applied to the members tending to move the member 28 upwardly relative to the member 10 as the members move horizontally relative to each other, the roller 42 will move slightly upwardly into load carrying engagement with its respective edge portion 20 and roll therealong while the roller 40 will move slightly upwardly away from its respective edge portion 22 to again provide for relative horizontal movement between the members with a minimum of rolling friction therebetween, since only roller 42 is then in a load carrying relationship.

It will be understood that the front portion of the member 10, not shown, will be connected to the lower hinge member, not shown, by a link or in any other suitable manner. Further, although the slot 18 is shown as a closed slot, this slot can be open at one end if desired. Likewise the rollers 40 and 42 may or may not engage the end portions of the slot to control the limits of horizontal movement between the members 10 and 28.

Although the invention has been shown and described in conjunction with a vehicle hood hinge, it is understood that it is equally applicable to other vehicle body hardware components. Further, although the invention has been described in conjunction with vertical loading between the members 10 and 28, as the members move horizontally, it will be understood that the invention is equally applicable to horizontal loading between the members during relative vertical movement.

Thus this invention provides an improved pivotal and movable connection between relatively movable members.

The embodiments of the invention in which an exclusive property or privlege is claimed are defined as follows:

1. A pivotal and movable connection between a pair of members, one member including elongated planar portions located in generally parallel planes, each having an elongated edge portion, said edge portions cooperatively defining an elongated slot, a shaft mounted to the other member and extending through the slot, a pair of rollers rotatably mounted on the shaft, each roller being located in immediate adjacent spaced relationship to a respective edge portion of the slot and being rollingly engageable only with such respective edge portion upon a load being applied to the members in a direction moving such roller toward its respective slot edge portion while moving the other roller away from its respective slot edge portion, and cooperating engageable means on the members to laterally locate the members relative to each other and thereby locate the rollers with respect to their respective slot edge portions.

2. A pivotal and movable connection between a pair of members, one member including elongated planar portions located in generally parallel planes, each having an elongated edge portion, said edge portions cooperatively defining an elongated slot, a pair of independently rotatable rollers mounted on the other member, each roller being located in immediate adjacent spaced relationship to a respective edge portin of the slot and being rotatably engageable only with such respective edge portion upon a load being applied to the members in a direction moving such roller toward its respective slot edge portion while moving the other roller away from its respective slot edge portion, and spacer means on opposite sides of the offset portion and adjacent each slot edge portion for engaging the other member to laterally locate the members relative to each other and thereby locate the rollers with respect to their respective slot edge portions.

3. A pivotal and movable connection between a pair of members, one member including elongated planar portions located in generally parallel planes, each having an elongated edge portion, said edge portions cooperatively defining an elongated slot, a shaft mounted to the other member and extending through the slot, a pair of rollers independently rotatably mounted on the shaft, each roller being located in immediate adjacent spaced relationship to a respective edge portion of the slot and rotatably engageable only with such respective edge portion upon a load being applied to the shaft in a direction moving such roller toward its respective slot edge portion while moving the other roller away from its respective slot edge portion, and lateral spacer means on one side of one planar portion and on the other side of the other planar portion, the spacer means projecting coplanar with the same side of the other planar portion, and means on the shaft engageable with a spacer means and the same side of the other planar portion to laterally locate the members relative to each other and thereby locate the rollers with respect to their respective slot edge portions.

* * * * *